United States Patent [19]
Maeda

[11] Patent Number: 5,897,652
[45] Date of Patent: Apr. 27, 1999

[54] MEMORY CONTROL DEVICE AND ADDRESS GENERATING CIRCUIT

[75] Inventor: Yasuaki Maeda, Kanagawa, Japan

[73] Assignee: Sony Corporation, Tokyo, Japan

[21] Appl. No.: 08/944,719

[22] Filed: Oct. 6, 1997

Related U.S. Application Data

[63] Continuation of application No. 08/808,054, Feb. 28, 1997, which is a continuation of application No. 08/230,542, Apr. 23, 1993, abandoned.

[30] Foreign Application Priority Data

Apr. 23, 1993 [JP] Japan ................................. 5-119303

[51] Int. Cl.⁶ .............................................. G06F 12/02
[52] U.S. Cl. ......................................... 711/100; 711/200
[58] Field of Search ................................... 711/100, 200

[56] References Cited

U.S. PATENT DOCUMENTS

| | | | |
|---|---|---|---|
| 4,692,859 | 9/1987 | Ott | 364/200 |
| 4,811,203 | 3/1989 | Hamstra | 395/200.11 |
| 5,111,444 | 5/1992 | Fukushima | 369/58 |
| 5,123,088 | 6/1992 | Kasahara | 395/159 |
| 5,214,781 | 5/1993 | Miki | 395/600 |
| 5,218,450 | 6/1993 | Nagai et al. | 358/335 |
| 5,253,337 | 10/1993 | Hirose | 395/161 |
| 5,255,272 | 10/1993 | Gill | 371/40.3 |
| 5,265,230 | 11/1993 | Saldanha | 395/425 |
| 5,295,124 | 3/1994 | Shirako | 369/32 |
| 5,325,347 | 6/1994 | Sako | 369/48 |
| 5,410,526 | 4/1995 | Maeda et al. | 369/48 |
| 5,410,667 | 4/1995 | Belsan | 395/425 |
| 5,434,991 | 7/1995 | Maeda et al. | 395/425 |
| 5,448,728 | 9/1995 | Takano | 395/600 |
| 5,535,335 | 7/1996 | Cox | 395/200.11 |
| 5,553,048 | 9/1996 | Maeda | 369/60 |
| 5,659,529 | 8/1997 | Maeda et al. | 369/59 |
| 5,675,559 | 10/1997 | Maeda et al. | 369/32 |
| 5,699,336 | 12/1997 | Maeda et al. | 369/54 |
| 5,748,588 | 5/1998 | Maeda et al. | 369/54 |

FOREIGN PATENT DOCUMENTS

| | | | |
|---|---|---|---|
| 0275972 A1 | 7/1988 | European Pat. Off. | G11B 7/013 |
| 0281415 A2 | 9/1988 | European Pat. Off. | G11B 27/32 |
| 0378449 A2 | 7/1990 | European Pat. Off. | G11B 27/28 |
| 0399853 A2 | 11/1990 | European Pat. Off. | G11B 5/012 |
| 0448378 A2 | 9/1991 | European Pat. Off. | G11B 7/007 |
| 0465053 A3 | 1/1992 | European Pat. Off. | G11B 20/20 |
| 0472343 A1 | 2/1992 | European Pat. Off. | G11B 7/00 |
| 0506471 A1 | 9/1992 | European Pat. Off. | G11B 7/007 |
| 0535832 A1 | 4/1993 | European Pat. Off. | G11B 20/00 |
| 0540164 A1 | 5/1993 | European Pat. Off. | G11B 20/00 |
| 0543446 A1 | 5/1993 | European Pat. Off. | G11B 20/20 |
| 0586189 A2 | 3/1994 | European Pat. Off. | G11B 19/02 |
| 0596417 A2 | 5/1994 | European Pat. Off. | G11B 20/10 |
| 0621596 A2 | 10/1994 | European Pat. Off. | G11B 20/10 |
| 5-89602 | 4/1993 | Japan | G11B 20/12 |
| 5-89643 | 9/1993 | Japan | G11B 27/00 |

OTHER PUBLICATIONS

Electronics & Wireless World, Oct. 1986, No. 1608, "IBM's PC Filing System," F. Stubbs, Ph.D.

Patent Abstracts of Japan, vol. 17, No. 616 (P–1643), Nov. 12, 1993, JP–A–05189933 (Sony Corp.) Jul. 30, 1993.

*Primary Examiner*—Eric Coleman
*Attorney, Agent, or Firm*—Limbach & Limbach L.L.P.

[57] ABSTRACT

A memory control device having a memory for reading out and holding managing data from a recording medium is equipped with a memory controller for outputting write-in/read-out addresses through an address generating circuit and receiving write-in/read-out data, and a system controller for controlling the memory controller to execute the data write-in/read-out operation on the memory. When link data in the managing information is supplied from the system controller or obtained from the data read in from the memory, an address to be next accessed on the basis of the link data is calculated and the calculated address is output to the memory.

16 Claims, 12 Drawing Sheets

FIG.4 PRIOR ART

CORRESPONDING TABLE INDICATING DATA PORTION (TABLE POINTER)

| P-DFA : 00h | P-EMPTY : (08h) | P-FRA : (01h) |
|---|---|---|
| P-TN01 : (02h) | P-TN02 : (04h) | P-TN03 : (03h) |
| P-TN04 : (07h) | P-TN05 : 00h | P-TN06 : 00h |
| P-TN07 : 00h | P-TN08 : 00h | P-TN09 : 00h |
| P-TN0253 : 00h | P-TN0254 : 00h | P-TN0255 : 00h |

MANAGING TABLE PORTION (255 PART TABLES)

| | START ADDRESS | END ADDRESS | TRACK MODE | LINK INFORMATION |
|---|---|---|---|---|
| (01h) | $A_7$ | $A_8$ | | (09h) |
| (02h) | $A_1$ | $A_2$ | | 00h |
| (03h) | $A_5$ | $A_6$ | | 00h |
| (04h) | $A_3$ | $A_4$ | | (06h) |
| (05h) | $A_{13}$ | $A_{14}$ | | 00h |
| (06h) | $A_{11}$ | $A_{12}$ | | 00h |
| (07h) | $A_9$ | $A_{10}$ | | (05h) |
| (08h) | 00h | 00h | | (0Ah) |
| (09h) | $A_{15}$ | $A_{16}$ | | 00h |
| (0Ah) | 00h | 00h | | (0Bh) |
| (0Bh) | 00h | 00h | | (0Ch) |
| (FEh) | 00h | 00h | | (FFh) |
| (FFh) | 00h | 00h | | 00h |

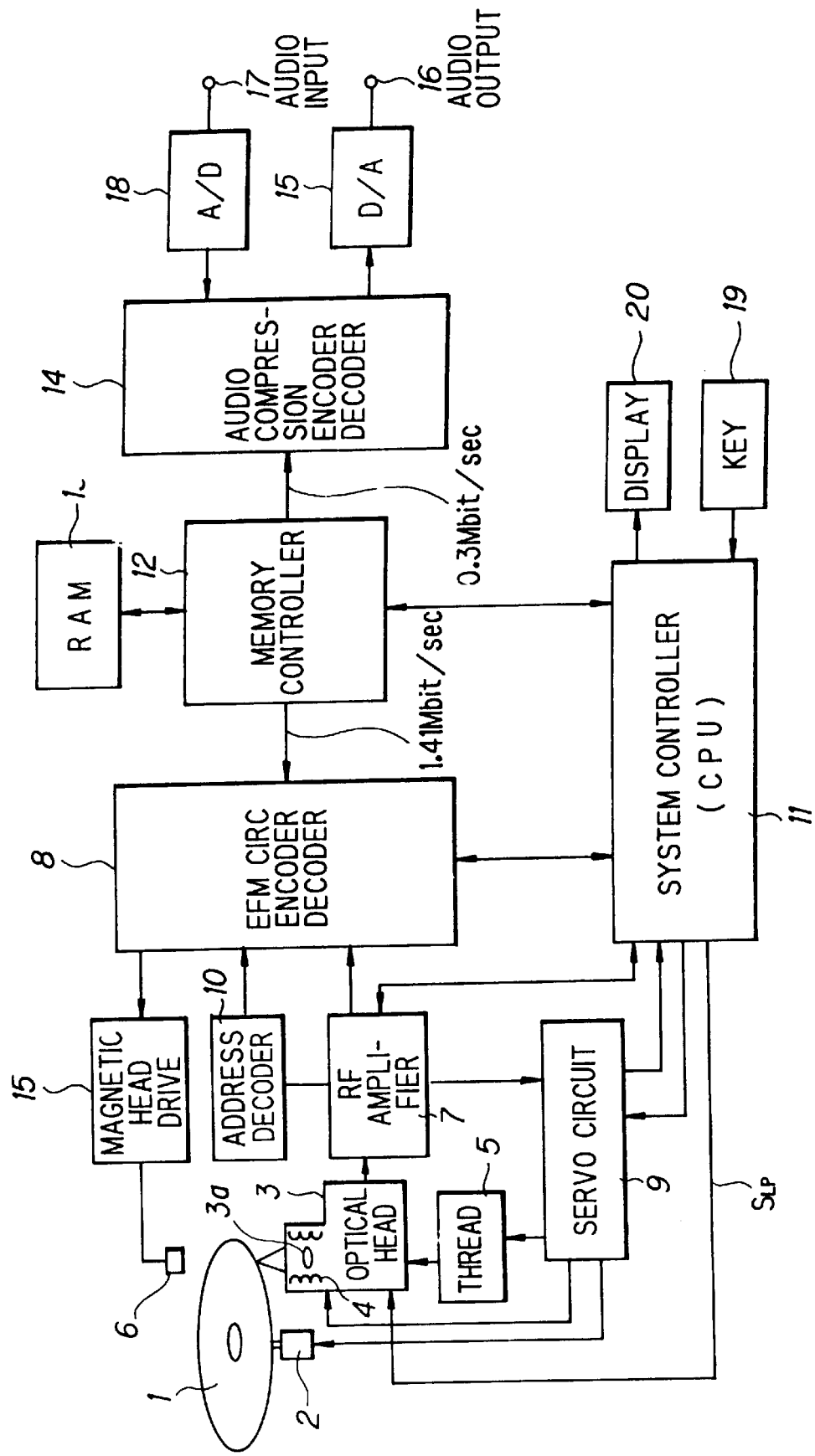

FIG.6

| 16bit | | 16bit | | |
|---|---|---|---|---|
| MSB — LSB | MSB — LSB | MSB — LSB | MSB — LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| ClusterH | ClusterL | 00000000 | 00000000 | 3 |
| 00000000 | 00000000 | 00000000 | 00000000 | 4 |
| 00000000 | 00000000 | 00000000 | 00000000 | 5 |
| "M" | "I" | "N" | "I" | 6 |
| Disc type | Rec power | First TNO | Last TNO | 7 |
| READ-OUT START ADDRESS (RO_A) | | | Used Sectors | 8 |
| POWER CALL AREA START ADDRESS (PC_A) | | | 00000000 | 9 |
| U-TOC START ADDRESS (UST_A) | | | 00000000 | 10 |
| RECORDABLE USER AREA START ADDRESS (RST_A) | | | 00000000 | 11 |
| 00000000 | P-TNO1 | P-TNO2 | P-TNO3 | 12 |
| P-TNO4 | P-TNO5 | P-TNO6 | P-TNO7 | 13 |
| P-TNO248 | P-TNO249 | P-TNO250 | P-TNO251 | 74 |
| P-TNO252 | P-TNO253 | P-TNO254 | P-TNO255 | 75 |
| 00000000 | 00000000 | 00000000 | 00000000 | 76 |
| 00000000 | 00000000 | 00000000 | 00000000 | 77 |
| (01h) START ADDRESS | | | TRACK MODE | 78 |
| END ADDRESS | | | 00000000 | 79 |
| (02h) START ADDRESS | | | TRACK MODE | 80 |
| END ADDRESS | | | 00000000 | 81 |
| (03h) START ADDRESS | | | TRACK MODE | 82 |
| END ADDRESS | | | 00000000 | 83 |
| (FCh) START ADDRESS | | | TRACK MODE | 580 |
| END ADDRESS | | | 00000000 | 581 |
| (FDh) START ADDRESS | | | TRACK MODE | 582 |
| END ADDRESS | | | 00000000 | 583 |
| (FEh) START ADDRESS | | | TRACK MODE | 584 |
| END ADDRESS | | | 00000000 | 585 |
| (FFh) START ADDRESS | | | TRACK MODE | 586 |
| END ADDRESS | | | 00000000 | 587 |

Brackets: SYNC HEADER (rows 0–5); CORRESPONDING TABLE INDICATING DATA PORTION (rows 12–77); MANAGING TABLE PORTION (255 PART TABLES) (rows 78–587)

P-TOC SECTOR 0

FIG.7

| | 16bit | | 16bit | | |
|---|---|---|---|---|---|
| | MSB            LSB | MSB            LSB | MSB            LSB | MSB            LSB | |
| SYNC HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | 00000000 | 00000000 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disc serial No | 10 |
| CORRESPONDING TABLE INDICATING DATA PORTION | Disc | ID | P-DFA | P-EMPTY | 11 |
| | P-FRA | P-TN01 | P-TN02 | P-TN03 | 12 |
| | P-TN04 | P-TN05 | P-TN06 | P-TN07 | 13 |
| | P-TN0248 | P-TN0249 | P-TN0250 | P-TN0251 | 74 |
| | P-TN0252 | P-TN0253 | P-TN0254 | P-TN0255 | 75 |
| | 00000000 | 00000000 | 00000000 | 00000000 | 76 |
| | 00000000 | 00000000 | 00000000 | 00000000 | 77 |
| (01h) | START ADDRESS | | | TRACK MODE | 78 |
| | END ADDRESS | | | LINK INFORMATION | 79 |
| (02h) | START ADDRESS | | | TRACK MODE | 80 |
| | END ADDRESS | | | LINK INFORMATION | 81 |
| (03h) | START ADDRESS | | | TRACK MODE | 82 |
| | END ADDRESS | | | LINK INFORMATION | 83 |
| MANAGING TABLE PORTION (255 PART TABLES) (FCh) | START ADDRESS | | | TRACK MODE | 580 |
| | END ADDRESS | | | LINK INFORMATION | 581 |
| (FDh) | START ADDRESS | | | TRACK MODE | 582 |
| | END ADDRESS | | | LINK INFORMATION | 583 |
| (FEh) | START ADDRESS | | | TRACK MODE | 584 |
| | END ADDRESS | | | LINK INFORMATION | 585 |
| (FFh) | START ADDRESS | | | TRACK MODE | 586 |
| | END ADDRESS | | | LINK INFORMATION | 587 |

U-TOC SECTOR 0

MEMORY CONTROL DEVICE AND ADDRESS GENERATING CIRCUIT

This is a continuation of co-pending application Ser. No. 08/808,054 filed on Feb. 28, 1997, which is a file wrapper continuing application of application Ser. No. 08/230,542 filed on Apr. 23, 1993.

BACKGROUND OF THE INVENTION

1. Field of the Invention

This invention relates to a memory control device for use in a recording and/or reproducing apparatus capable of recording and/or reproducing data organized in programs (such as audio data, musical pieces, etc.), on a disc-type recording medium for example. This invention further relates to an address generating circuit equipped in the memory control device.

2. Background Art

There have been known data re-writable disc media on which a user can record programs (such as musical pieces, etc.). These disc media are provided with a data area (user TOC, hereinafter referred to "U-TOC") for managing areas on which the programs have been already recorded, and for managing recordable areas. These media are designed so that managing data for these areas is re-written every time a recording operation, an erasing operation or an overwriting operation for the programs is performed.

For instance, an audio recording device is designed so that in an audio recording operation for a program, a recordable area on a disc is located on the basis of the U-TOC. The device then records the program for the audio data on this recordable area. On the other hand, for a reproducing device, the U-TOC data is used to locate an area on which a program to be reproduced is recorded. The device then accesses the area to carry out a reproducing operation for the program.

In such disc media, the area management on the disc and the position management of the U-TOC are carried out on the basis of a pre-mastered TOC (hereinafter referred to as "P-TOC"). The P-TOC comprises managing information formed as pit data.

One known type of disc media is a pre-mastered disc medium in which programs (such as musical pieces, etc.) are recorded as pit information. This type of disk medium is exclusively used for reproduction. The rewriting of the managing information is not required for this pre-mastered type of disk, and the area management of the programs is carried out solely on the basis of the P-TOC.

Generally, for a recordable disc medium, such as a magneto-optical disc (MO disc) or the like, random access can be more easily carried out as compared to a tape recording medium formed as a tape, such as a compact cassette tape or the like. Furthermore, when recording on a disc medium it is not generally necessary to record a program (such as a musical piece) on a continuous segment. Note that in this specification, the term "segment" is defined as a track portion on which physically-continuous data is recorded. That is, no problem would occur if the program is divided and recorded in discrete, plural segments.

In some systems, data is read out of a magneto-optical disc and temporarily stored into a buffer memory (buffer RAM) at a high rate of speed. Then the data is read out as an audio reproducing signal from the buffer RAM at a low rate of speed to perform a demodulation processing. In such systems the high-speed accessing data from the magneto-optical disc enables a reproduced program (such as a musical piece) to be output without being interrupted even if the data read-out operation from the magneto-optical disc is temporarily interrupted.

Accordingly, by repeating a recording or reproducing operation between the segments and a high-speed access operation, the recording or reproduction of a program can be performed without interruption even when a track for the program is physically divided and separated into plural segments. However, the high-speed access operation is sometimes interrupted due to data accumulation caused by the difference between the write-in and read-out rates of the buffer RAM.

For example, as shown in FIG. 1, it is possible that each of first and second programs are continuously recorded on a segment $T_1$, $T_2$. However, fourth and fifth programs may be respectively recorded on discrete segments $T_{4(1)}$–$T_{4(4)}$, $T_{5(1)}$–$T_{5(2)}$ which can be found over several tracks. FIG. 1 shows this example schematically. In practice, one segment frequently extends over several tracks to several hundreds of tracks.

When the recording, erasing or overwriting operation for programs is repeated for the magneto-optical disc, empty areas are irregularly produced on the tracks due to the difference between time periods of programs to be recorded and time periods of previously erased programs. Through the above discrete recording operation, any program which is longer than a previously erased program can be recorded using the erased portion, and thus the data recording area can be effectively used. Note that recordable programs are not limited to programs, and any program corresponding to an audio signal may be so recorded. For the sake of brevity, in this specification, any lump of data (a recording data unit) which has a linked content in combination may hereinafter be referred to as a "program".

Of course, when the recording operation is carried out for the above type of disc medium, the audio recording operation must be continuously carried out while accessing plural segments serving as recordable areas, and when the reproducing operation is carried out, the segments must be accessed in such a manner that a piece of music is accurately and continuously reproduced. In order to satisfy such a requirement, both data for linking the segments allocated to a piece of music (for example, $T_{4(1)}$–$T_{4(4)}$) and data which indicates recordable areas are stored as U-TOC information which will be rewritten every recording, erasing or overwriting operation as described above. The recording/reproducing apparatus accesses the U-TOC information and stores it into the memory, for example, at the time when a disc is loaded. Further, when a recording, reproducing, erasing or overwriting operation or the like is carried out, a head access is carried out on the basis of the U-TOC information stored in the memory to thereby control the recording, reproducing, erasing or overwriting operation.

A recording track of the magneto-optical disc comprises continuously-formed clusters CL (=36 sectors) each of which includes a sub data area of 4 sectors (one sector=2352 bytes) and a main data area of 32 sectors as shown in FIG. 2. One cluster serves as a minimum unit for the recording operation, and has a length corresponding to two or three rounds of the disc. An address is recorded for every sector. The sub data area of 4 sectors is used for sub data or as a link area. TOC data, audio data, etc. are recorded in the main data area of 32 sectors.

As shown in FIG. 2, the sectors are further divided into sound groups. Each unit of two sectors is divided into 11 sound groups. Data of 512 samples are recorded in an audio group while being separated into left (L) and right (R) channels. One sound group has an audio data whose time corresponds to 11.6 msec.

With reference to FIG. 3, the management state by the U-TOC will now be described. FIG. 3 schematically shows the area structure of the disc track in its radial direction, and the area structure will be first described. For a magneto-optical disc, the area structure is mainly divided into an area (a pre-mastered area on which data is recorded with emboss pits) which is represented as a pit area in FIG. 3, and a groove area which includes several groups and is formed as a magneto-optical area.

A pre-mastered TOC (hereinafter referred to as "P-TOC") serving as managing information is repetitively recorded on the pit area. In the P-TOC, the position of the U-TOC is indicated using a U-TOC start address, $UST_A$. Also recorded in the P-TOC are a read-out start address $RO_A$, a recordable user area start address $RST_A$, a power cal (calibration) area start address PCA, etc. as indicated.

The groove area is formed subsequently to the pit area at the innermost peripheral side of the disc. Within the groove area, an area extending to the address which is indicated as the read-out start address $RO_A$ in the P-TOC is used as a recordable area. A subsequent area is used as a read-out area (as shown in FIG. 3).

A recordable user area of the recordable area, in which programs are actually recorded, extends from the position (address $A_{MIN}$) indicated as a recordable user area start address $RST_A$ to the position (address $A_{MAX}$) just before the read-out start address $RO_A$.

An area, called the U-TOC area, is located before the recordable user area start address $RST_A$ in the groove area, as shown in FIG. 3. The U-TOC area is used as a managing area for recording and reproducing operations. The U-TOC, as described above, is recorded in this area. Also included in the U-TOC area is a laser power calibration area. The length of the laser power calibration area corresponds to one cluster starting at the position indicated as the power cal area start address $PC_A$.

The U-TOC is recorded at over three successive clusters starting at a predetermined position in the U-TOC area for managing the recording and reproducing operations. The address position at which the U-TOC is recorded is indicated by the U-TOC start address $UST_A$. The U-TOC is provided with information on the recording status of the recordable user area as managing information.

Now, it is assumed that four programs (audio data) $M_1$ to $M_4$ are recorded in the recordable user area as shown in FIG. 3. That is, a first program $M_1$ is recorded on segments of addresses $A_1$ ($=A_{MIN}$) to $A_2$. A second program $M_2$ is divided into a portion $M_{2(1)}$ which is to be recorded on segments of addresses $A_3$ to $A_4$, and a portion $M_{2(2)}$ which is to be recorded on segments of addresses $A_{11}$ to $A_{12}$. A third program $M_3$ is recorded on segments of addresses $A_5$ to $A_6$. A fourth program $M_4$ is recorded divided into a portion $M_{4(1)}$ which is recorded on segments of addresses $A_9$ to $A_{10}$, and a portion $M_{4(2)}$ to be recorded on segments of addresses $A_{13}$ to $A_{14}$.

In this state, segment $F_{(1)}$ of addresses $A_7$ to $A_8$, and segment $F_{(2)}$ of addresses $A_{15}$ to $A_{16}$ (Note: $A_{16}=A_{MAX}$) are allocated to unrecorded areas on which no audio data has been yet recorded. That is, $F_{(1)}$ and $F_{(2)}$ are recordable free areas.

This state (area structure) is managed as shown in FIG. 4 in the U-TOC. The U-TOC is provided with a corresponding table indicating data portion which includes various kinds of table pointers (P-DFA, P-EMPTY, P-FRA, P-TNO1 to P-TNO255) as shown in FIG. 4. The U-TOC also has a managing table portion having 255 part tables (01h) to (FFh) in correspondence with the corresponding table indicating data portion. Each part table contains a start address, an end address, a track mode for one segment on the disc, and link information for linking the part table to another part table.

In this construction, each part table is indicated by a table pointer of the corresponding table indicating data portion to thereby manage the segments. The table pointer P-DFA indicates a defective area on the disc. Now, assuming that no defects exist in the recordable user area as shown in FIG. 3, the table pointer P-DFA is set to "00h". The table pointer P-EMPTY indicates an unused part table. The table pointer P-FRA is used to manage recordable areas (free areas), and in the case of FIG. 4 it is assumed that the table pointer P-FRA indicates a part table (01h). Actually, each table pointer indicates a part table with a numerical value with which the address for the part table is determined through a predetermined calculation processing.

In this case, information on the free area $F_{(1)}$ as shown in FIG. 4 is indicated in the part table (01h), that is, the addresses $A_7$ and $A_8$ are indicated as a start address and an end address, respectively. Further, since another segment serving as the free area $F_{(2)}$ exists, a part table (09h) is indicated by link information of the part table (01h). In practice, this link information is also represented by a numerical value with which the address for a part table is determined through a predetermined calculation processing. In correspondence with the free area F(2), the addresses $A_{15}$ and $A_{16}$ are indicated as a start address and an end address respectively in the part table (09h). Since no further segment serving as a free area exists, this part table (09h) is not required to be linked to another part table, and thus the link information thereof is set to "00k".

Through the management of the free areas as described above, the address for any segment serving as a free area can be obtained by searching part tables with the table pointer P-FRA being set to a starting point, and the audio data or the like can be recorded on the segments serving as the free areas.

Those audio data which have been already recorded are managed in the same manner as described above. With respect to the programs (audio data), 255 programs at maximum can be managed by the table pointers P-TNO1 to P-TNO255.

With respect to the first program $M_1$ for example, the start address $A_1$ and the end address $A_2$ therefor are indicated in a part table (02h) which is indicated by the table pointer P-TNO1. Since the program $M_1$ is recorded on one segment, the link information of the part table (02h) is set to "00h".

Further, with respect to the second program $M_2$, the start address $A_3$ and the end address $A_4$ therefor are indicated in a part table (04h) which is indicated by the table pointer P-TNO2. In this case, the program $M_2$ is recorded on two separate segments, and thus the addresses $A_3$ and $A_4$ indicate only the segment for the first half ($M_{2(1)}$) of the program $M_2$. Accordingly, in this case, a part table (06h) is indicated by the link information for the part table (04h), and the start address $A_{11}$ and the end address $A_{12}$ are recorded in the part table (06h) to indicate the other segment for the second half ($M_{2(2)}$). No further linkage is required for this program, and thus the link information of the part table (06h) is set to "00h".

With respect to the third and fourth programs $M_3$ and $M_4$, the positions of segments for these programs are managed by those part tables which are obtained from the table pointers P-TNO3 and P-TN04 which respectively indicate the first associated part tables for the programs. In this case, since only four programs are recorded, the table pointers P-TNO5 to P-TNO255 are not used and thus set to "00h".

The segment position of each program is managed in the manner as described above, and thus the reproducing operation can be properly performed even when plural programs are required to be reproduced in an irregular order or when each of the programs are separately recorded in two or more segments.

As described above, the table pointer P-EMPTY indicates an unused part table, and in this case the table pointer P-EMPTY indicates a part table (08h). On the basis of the link information of the part table (08h), unused part tables which are linked to one another until an unused part table (FFh) serving as the last part table are indicated by the link information (i.e., these unused part tables are subjected to the link management) as shown in FIG. 4. The link information of the part table which is the last part table for the linked, unused part tables (in this case, the part table (FFh)) is set to "00h" to indicate no further linkage.

By the way, as described above, the segments for programs and free areas are managed in a link mode using the table pointers and the link data of the link information in the U-TOC (pre-mastered programs are managed in the same manner on the P-TOC). However, for this link data, the addresses for the part tables to be linked are not directly indicated in the U-TOC (or P-TOC), and they are determined through a predetermined calculation using the link data.

For example, in a case of a magneto-optical disc system for performing management in the mode as shown in FIG. 4, the address of a part table in an U-TOC sector is indicated in each table pointer by a calculation of $(76\times4)+((Px)\times8)$, and the value of (Px) is recorded in the table pointer. For example when a numerical value "5" is recorded as a table pointer P-FRA to indicate a part table, the part table indicated by the table pointer P-FRA corresponds to a part table which is recorded from a byte position (344th byte) obtained through the calculation of $(76\times4)+(5\times8)=344$ in the U-TOC sector (one sector comprises 2352 bytes).

Similar to the convention used for table pointers, the link information of each part table by (Lx) representing the byte position of a part table to be linked is obtained through the calculation of $(76\times4)+((Lx)\times8)$, thereby indicating the part table to be linked.

The search of free areas in the recording operation, the address search of segments to be reproduced in the reproducing operation, the address search of segments to be erased in the erasing operation, etc. are performed by tracing the linkage of the part tables on the U-TOC. In this case the calculation processing as described above must be carried out on the basis of the table pointers or the link information to obtain the address of a read-in part table.

Usually, such a recording apparatus is equipped with a memory controller for carrying out the output of the memory write-in/read-out address and reception of storage data for a memory for holding the P-TOC and the U-TOC. Usually, a system controller controls the memory controller to execute the storage/read-out of the data. The system controller reads in the P-TOC and the U-TOC from the memory to control the actual recording, reproducing and other operations.

When reading in the managing information (art tables) of the link mode as described above, the system controller carries out the above calculation on the basis of the table pointer or link information to calculate the address of a part table to be next read in, and supplies the calculated address through the memory controller to the memory to thereby perform the read-out of the data of the part table.

However, since the calculation processing as described above must be carried out, there occurs a problem that a large processing load is imposed on the system controller. Further, the calculated address as well as the read-out executing command must be output to the memory controller, and thus more time is required for the data communication. Particularly in the case where the memory controller and the system controller carry out the data reception and transmission through a serial communication, the processing time increases as the data amount to be communicated is increased.

In the course of the recording/erasing operation of programs (such as musical pieces or the like) for this type of disc medium, there may occur a vain area (also called a trash area) which is not managed by the U-TOC having the managing mode as described above. This can be caused in a number of ways. For instance, in order to prevent audio data on another track from being erroneously erased when a program (audio data) is recorded, a guard band area whose length corresponds to several clusters is provided before and after the audio data. Also, the sound-recording start position is defined on the assumption that the audio recording is carried out on cluster basis. Also, the music may be edited by partially erasing or synthesizing a program (audio data).

For example, in the case of FIG. 3, portions as indicated by cross-hatching, such as areas of the addresses $A_4$ to $A_5$, the addresses $A_6$ to $A_7$ and the addresses $A_{12}$ to $A_{13}$ occur as trash areas. The segments for these trash areas do not appear in the managing mode of the U-TOC as shown in FIG. 4. The occurrence of these trash areas causes the reduction in recording capacity of the disc. In order to solve this problem, it has been conventionally adopted that the U-TOC is re-edited at a prescribed time to reduce the trash areas. The re-edit processing of the U-TOC is executed, for example when audio data is erased, or the re-editing of the U-TOC is instructed by an user's manipulation, or the control device determines an increase of trash areas.

In order to perform the processing to extinguish the trash areas, part tables (part tables linked on the basis of the table pointer P-FRA or P-TNO1 to P-TNO255 for the segment management) on the U-TOC must be searched to determine states (area arrangement) before and after the segment serving as a reference for editing (hereinafter referred to as "editing reference segment"). If the trash area processing is required to be executed when the program $M_3$ is erased, it is required to identify segments which are adjacently located before (in front of) and after (behind) a segment on which the program $M_3$ is recorded (i.e., an editing reference segment), and also determine whether these segments are located in an area where another program (audio data) is recorded (i.e., a audio data area) or in a free area. In addition, it is required to be determined whether any trash area exists between the editing reference segment and each of the segments before and after the editing reference segment. In this case, all the part tables which are used for the segment management must be searched.

In a case where a large number of part tables must be continuously read out as described above, the execution of the address calculation and the communication of the calculated addresses imposes a large processing load on the system controller, and the increase of the communication time causes the increase of the processing time. This exacerbates the above problems, and it becomes a critical problem for practical use of the recording or reproducing system.

Objects of this invention include realization of faster of read-out/write-in processing of managing data such as P-TOC, U-TOC, etc., and reduction in processing load of a system controller.

SUMMARY OF THE INVENTION

In order to attain the above objects, according to this invention, there is a memory control device for use in a recording apparatus or reproducing apparatus having memory means for reading out and holding managing data from a recording medium on which recording data and managing data for managing the recording data are recorded. A recording, reproducing or erasing operation for the recording medium can be carried out on the basis of the managing data in the memory means to edit the managing information in the memory means. The memory control device includes a memory controller which is equipped with an address generating circuit. The memory controller outputs write-in/read-out addresses to and receives write-in/read-out data from the memory means. The memory control device also includes a system controller for controlling the memory controller to execute the data write-in/read-out operations for the memory means. When link data provided in the managing information to link respective data is supplied from the system controller or it is taken out and supplied from data which are read from the memory means into the memory controller, the address generating circuit of the memory controller generates the address in the memory means to be next accessed using the link data and outputs the calculated address to the memory means.

The address generating circuit includes controller interface means for performing prescribed data communication with the system controller. The address generating circuit also includes memory interface means for receiving and transmitting the write-in data or the read-out data for the memory means. The address generating circuit also includes link data register means for holding link data supplied from the system controller through the controller interface means. Link data is taken out from the data which is read into the memory controller from the memory means through the memory interface means. The address generating circuit also includes address calculation means for executing a prescribed calculation processing on the link data held in the link data register means. The address generating circuit also includes address output means for outputting the values calculated in the address calculation means to the memory means as a part or all of the access addresses of the memory means.

When the managing information (P-TOC, U-TOC) is searched, a next access address is calculated on the basis of the link data in the address generating circuit of the memory controller, so that the processing load of the system controller which has been conventionally required for the above calculation can be removed. In addition, the communication of the address data between the system controller and the memory controller is unnecessary, and thus the data communication time can be remarkably shortened.

As the link data to be set in the address generating circuit, a table pointer (that is, not an access address which is obtained with a table pointer through the calculation processing, but the value of the table pointer itself) may be set by the system controller at the start time of the search of the part tables derived from a single table pointer set by the system controller. For part tables to be subsequently linked, the link information may be successively extracted and set from the data of a read-in part table.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 4 is a schematic view of a table showing the area management state of a recording area of a disc.

FIG. 5 is a block diagram showing a recording and reproducing apparatus equipped with a memory control device and an address generating circuit according to an embodiment of the present invention.

FIG. 6 is a schematic view of P-TOC information on a disc.

FIG. 7 is a schematic view of U-TOC information on a disc.

DESCRIPTION OF THE PREFERRED EMBODIMENTS

Figure 1:
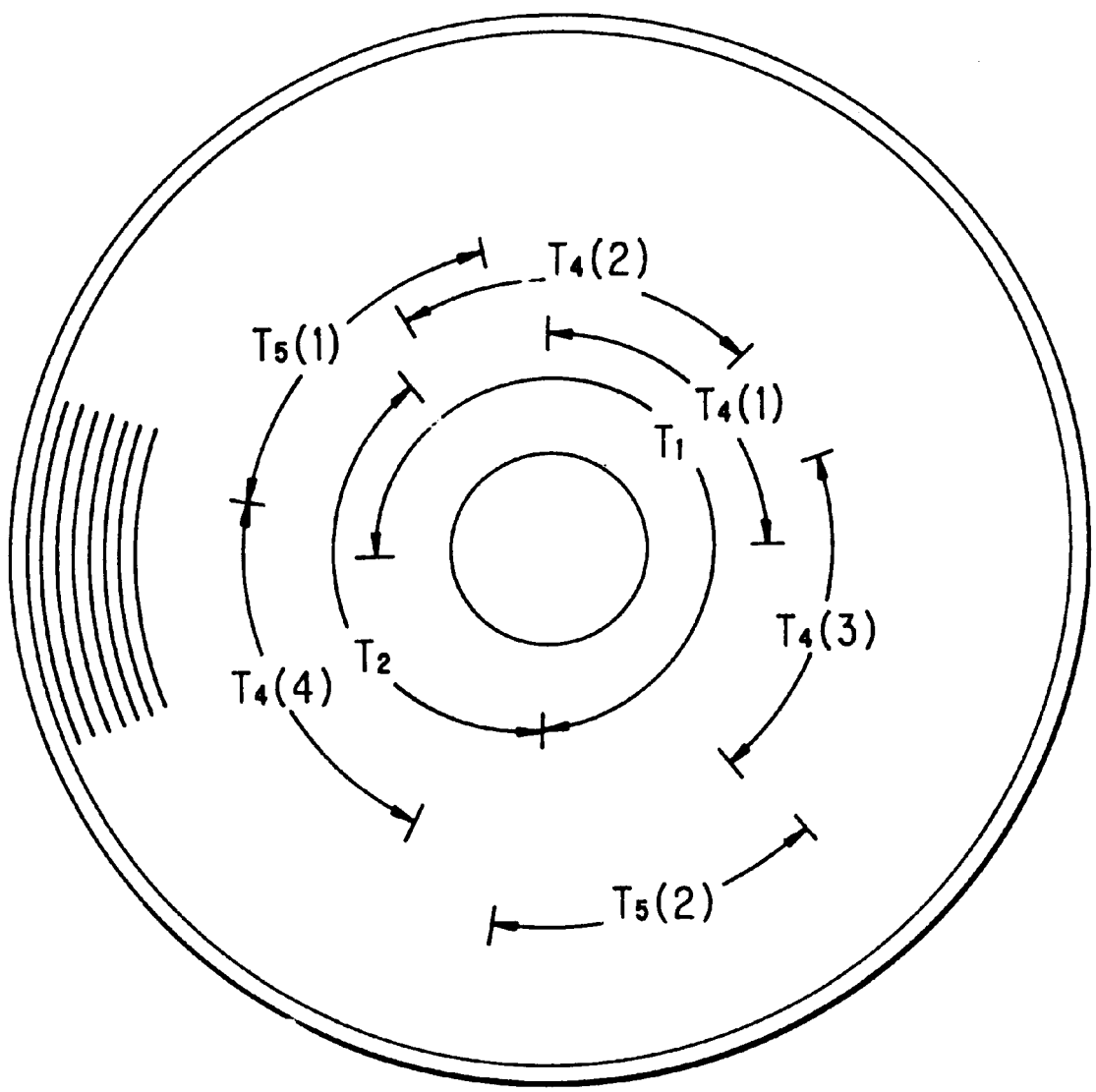
FIG. 1 is a schematic view of a disc on which discrete segment recording can be performed.
Figure 2:
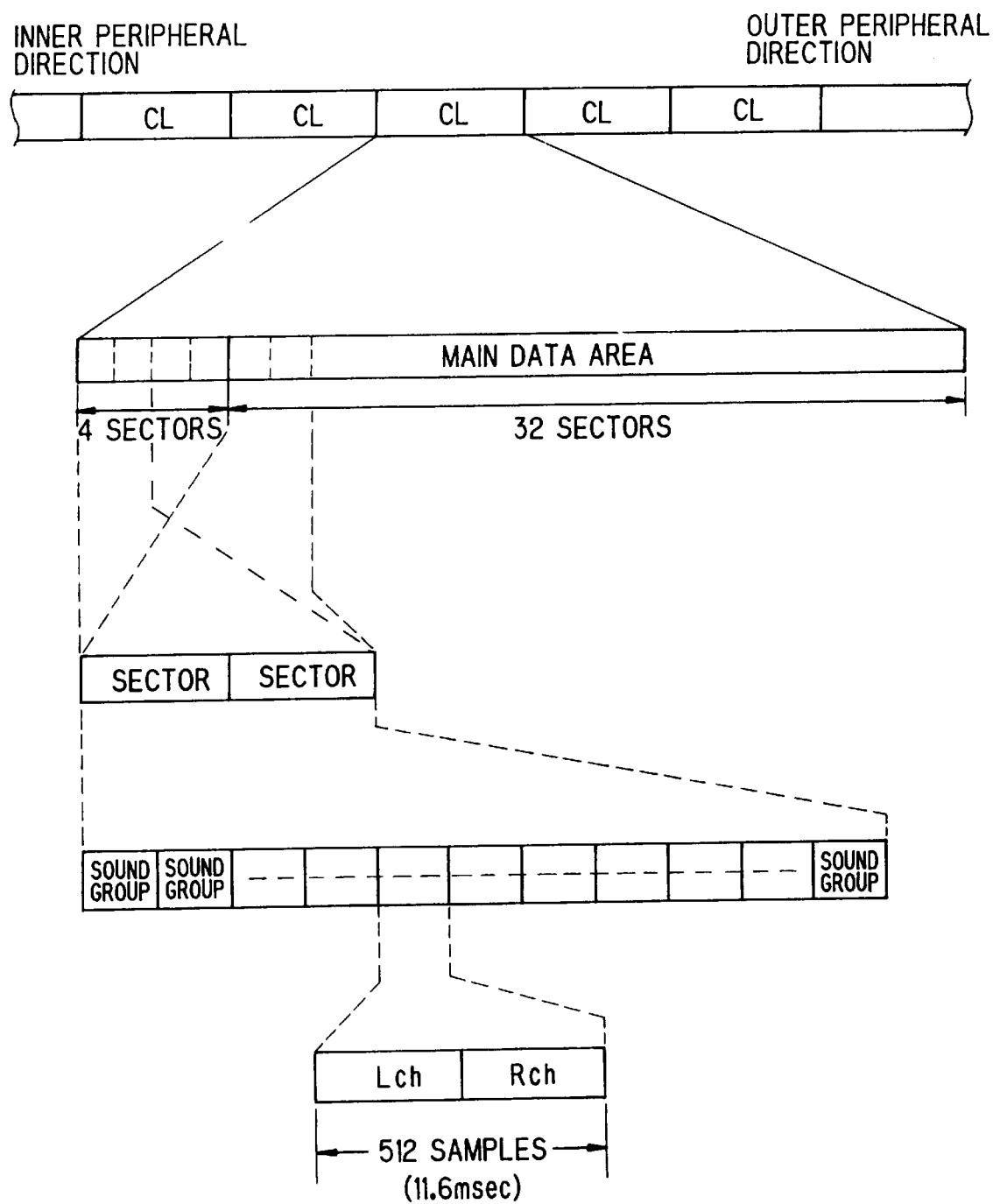
FIG. 2 is a schematic view of the track format of a disc.
Figure 3:
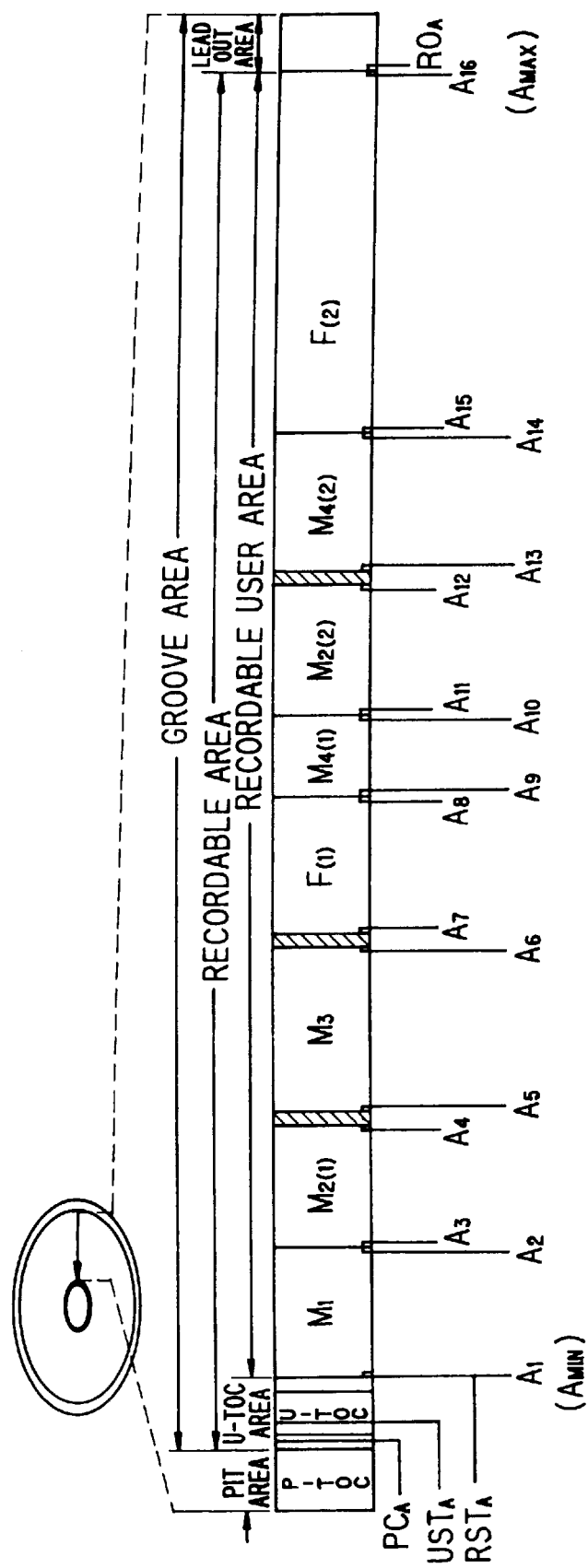
FIG. 3 is a schematic view of an area state on a disc.

An embodiment of a memory control device and an address generating circuit according to this invention will be described with reference to FIGS. 5 to 12. This embodiment relates to a memory control device for a recording and/or reproducing apparatus in which a magneto-optical disc is used as a recording medium, and an address generating circuit provided in the memory control device.

FIG. 5 is a block diagram showing the main part of the recording and reproducing apparatus. In FIG. 5, a reference numeral 1 represents a magneto-optical disc on which audio data or the like is recorded, and it is rotationally driven by a spindle motor 2. A reference numeral 3 represents an optical head for irradiating laser beam onto the magneto-optical disc 1 in recording/reproducing operations. In the recording operation, the optical head outputs a high-level laser beam to heat recording tracks up to the Curie temperature. In the reproducing operation the optical head outputs a relatively-low level laser beam to detect data from reflected light through the magnetic Kerr effect.

Accordingly, the optical head 3 is equipped with a laser diode serving as laser output means, an optical system comprising a deflection beam splitter, an objective lens 3a, etc., and a detector for detecting reflected light. The objective lens 3a is supported by a biaxial mechanism 4 to be displaceable in a disc radial direction and in such a direction toward and away from the disc (i.e. perpendicular to the major surface of the disc).

A reference numeral 6 represents a magnetic head for supplying the magneto-optical disc with magnetic field which is modulated by supplied data, and it is disposed at the opposite position to the optical head 3 with respect to the magneto-optical disc 1. The optical head 3 and the magnetic head 6 are movable in the disc radial direction by a thread mechanism 5.

Information which is detected from the magneto-optical disc 1 by the optical head 3 in the reproducing operation is supplied to an RF amplifier 7. The RF amplifier 7 conducts calculation processing on the supplied information to extract a reproduction RF signal, a tracking error signal, a focus error signal, an absolute position information (absolute position information recorded as a pre-groove (wobbling groove) on the magneto-optical disc 1), an address information, a focus monitor signal, etc. The extracted reproduction RF signal is supplied to an encoder/decoder unit 8. The tracking error signal and the focus error signal are supplied to a servo circuit 9, and the address information is supplied to an address decoder 10. The absolute position information and the focus monitor signal are supplied to a system controller 11 comprising a microcomputer.

The servo circuit 9 generates various kinds of servo driving signals on the basis of the supplied tracking error signal and focus error signal, and an auto music sensor instruction, a seek instruction, a rotational speed detection information of a spindle motor, etc. which are supplied from the system controller 11, and controls the biaxial mechanism 4 and the thread mechanism 5 to perform focus and tracking control. Further, the servo circuit 9 controls the spindle motor 2 at a constant angular velocity (CAV) or constant linear velocity (CLV).

The reproduction RF signal is subjected to a decoding processing such as EFM (eight fourteen modulation) demodulation, CIRC (cross-interleaved reed-solomon coding) or the like in the encoder/decoder unit 8, and then it is temporarily written in a buffer RAM 13 by the memory controller 12. The data read-out operation from the magneto-optical disc 1 by the optical head 3 and the transmission of reproduced data in a system which extends from the optical head 3 to the buffer RAM 13 are intermittently carried out at 1.41 Mbit/sec.

The data written in the buffer RAM 13 is read out at such a timing that the transmission of the reproduced data is carried out at 0.3 Mbit/sec, and supplied to the encoder/decoder unit 14. Thereafter, the data is subjected to a reproduction signal processing such as a decode processing for an audio compression processing, converted to analog signals by a D/A converter 15, and supplied to a prescribed amplifier circuit from a terminal 16 to be output as audio signals, for example, left (L) and right (R) audio signals.

The data write-in/read-out for the buffer RAM 13 is carried out using address indication through the control of write-in pointer and read-out pointer by the memory controller 12. The write-in pointer (write-in address) is incremented at 1.41 Mbit/sec timing as described above, and the read-out pointer (read-out address) is incremented at 0.3 Mbit/sec timing. Therefore, the buffer RAM 13 is kept in such a state that some amount of data will be accumulated in the buffer RAM 13 due to the difference in bit rate between the write-in and the read-out operations. At the time when full capacity of data is accumulated in the buffer RAM 13, the increment of the write-in pointer is stopped, and the data read-out operation from the magneto-optical disc 1 by the optical head 3 is also stopped. However, the increment of the read-out pointer is continued, and thus the reproduced audio output is not interrupted.

Thereafter, assuming that the read-out operation from the buffer RAM 13 is further continued and the data accumulation amount in the buffer RAM 13 is decreased below a predetermined amount, the increment of the data read-out operation and the increment of the write-in pointer W by the optical head 3 are resumed, and the data accumulation into the buffer RAM 13 is resumed.

By outputting the reproduced sound signal through the buffer RAM 13 in the manner as described above, the reproduced audio output will not be interrupted even when the tracking is deviated due to external disturbance or the like. By accessing an accurate tracking position before the accumulated data is used up and resuming the data read-out operation, the reproducing operation can be continued without an affect on the reproduction output, that is, the shock-proof function can be remarkably improved.

In FIG. 5, the address information output from the address decoder 10 and sub code data for the control operation are supplied through the encoder/decoder unit 8 to the system controller 11, and used for various kinds of control operations.

Further, the system controller 11 is supplied with a lock detection signal of a PLL circuit (not shown) for generating bit clocks for the recording/reproducing operations and a monitor signal for monitoring a lack state of a frame sync signal of the reproduction data (L, R channels).

The system controller 11 outputs a laser control signal SLP for controlling the operation of the laser diode of the optical head 3, and it serves to carry out ON/OFF control of the output of the laser diode. At the ON-control time, the system controller 11 switches the laser power between the relatively low level output in the reproducing operation and the relatively high level output in the recording operation.

When the recording operation is conducted on the magneto-optical disc 1, the recording signal (analog audio signal) supplied to the terminal 17 is converted to digital data by an A/D converter 18, and then supplied to the encoder/decoder unit 14 to be subjected to the audio compression encode processing. The recording data compressed by the encoder/decoder unit 14 is temporarily written in the buffer RAM 13 by the memory controller 12, and then read out at a prescribed timing to be transmitted to the encoder/decoder unit 8. In the encoder/decoder unit 8, the data is subjected to an encode processing such as CIRC encode, EFM modulation, etc., and then supplied to a magnetic head driving circuit 15.

The magnetic head driving circuit 15 supplies the magnetic head 6 with a magnetic head drive signal in accordance with the recording data which has been subjected to the encode processing. That is, application of N or S magnetic field to the magneto-optical disc 1 by the magnetic head 6 is executed. At this time, the system controller 11 supplies a control signal to the optical head 3 to output a laser beam having the proper power level for recording.

A reference numeral 19 represents an operation input unit provided with keys which are manipulated by an user, and a reference numeral 20 represents a display unit comprising a liquid crystal display, for example. The operation input unit 19 is provided with a sound-recording key, a reproducing key, a stop key, an AMS (auto music sensor) key, a search key, etc. for the user's manipulation.

When the recording/reproducing operation is conducted on the disc 1, managing information recorded on the disc 1, that is, P-TOC and U-TOC are read out, and in accordance with the managing information, the system controller 11 identifies the addresses of segments to be recorded on the disc 1 and the addresses of segments to be reproduced. This managing information is held in the buffer RAM 13. Therefore, the buffer RAM 13 is divided into a buffer area for the recording data/reproducing data, and an area for the managing information.

The system controller 11 executes the reproducing operation from the innermost peripheral side of the disc having the managing information recorded thereon at the time when the disc 1 is installed thereby reading out the managing information. This managing information is stored in the buffer RAM 13. In this way, the managing information is accessible for the recording/reproducing operations.

The U-TOC is edited in accordance with the recording or erasing operation of data, and if occasion demands, the U-TOC is edited with a merge processing for removing trash areas as described above. The system controller 11 conducts this edit processing on the U-TOC information stored in the buffer RAM 13 every time a recording/erasing operation is performed. Through the above rewriting operation, the U-TOC area on the disc 1 is rewritten at a prescribed timing.

When access of the buffer RAM 13 is carried out for an area on which the P-TOC and the U-TOC are recorded, an address to be accessed is generated inside of the memory controller 12 as described later. The P-TOC and the U-TOC on the disc 1 will now be described. The P-TOC information is used for area indication for recordable areas (recordable user area, etc.) on the disc, management for the U-TOC area, etc. When the disc 1 comprises a pre-mastered disc which is an optical disc exclusively used for reproduction, audio data which is fixedly recorded (like ROM) can be managed solely on the basis of P-TOC information. The format of the P-TOC is shown in FIG. 6.

FIG. 6 shows one segment (sector 0) for P-TOC information which is repetitively recorded in an area used for P-TOC (for example, in a ROM area at the innermost peripheral side of the disc). An area of five sectors from a sector 0 to a sector 4 is provided for the P-TOC. A sector 1 and subsequent sectors are optional, and the use of these sectors is dependent on the type of the apparatus.

The data area for the sector of the P-TOC comprises 4 bytes×588 (=2352 bytes). At the head position of this data area there is provided a header with a sync pattern of one byte data for all "0" or all "1", and addresses representing a cluster address and a sector address, etc., thereby indicating the P-TOC area. Subsequently to the header, an identification ID (ASCII code corresponding to the letters "MINI") is added at a predetermined address position.

Further subsequently thereto are recorded a disc type, a sound recording level, the number of a first recorded program (such as a program, the First TNO as shown in FIG. 6), the number of a last recorded program (the Last TNO as shown in FIG. 6), a read-out start address $RO_A$, a power cal area start address $PC_A$, a start address $UST_A$ of U-TOC (data area of U-TOC sector 0 of FIG. 7 to be described later), a start address $RST_A$ for a recordable area, etc.

Figure 8A:
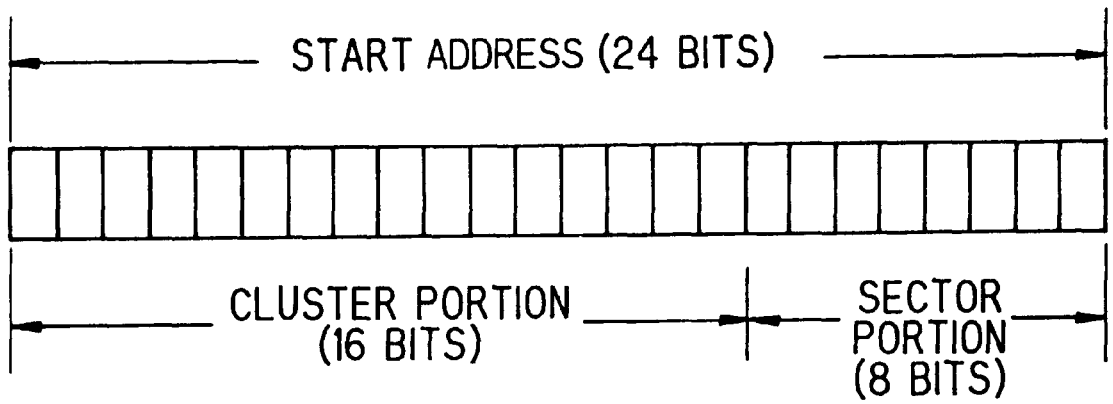
FIG. 8A and 8B are schematic views respectively showing an address data format of P-TOC and U-TOC information on a disc.

The start addresses of 24 bits (3 bytes) are divided into upper digits of 16 bits which are used as a cluster address, and lower digits of 8 bits which are used as a sector address as shown in FIG. 8A. The area management on the disc 1 is carried out by these start addresses as described above.

Further, there is provided a corresponding table indicating data portion having table pointers (P-TNO1 to P-TNO255) for corresponding respectively recorded programs (such as musical pieces) to part tables in a managing table portion as described later.

Further, in an area subsequent to the corresponding table indicating data portion is provided a managing table portion which is equipped with 255 part tables of (01h) to (FFh) in correspondence with the table pointers (P-TNO1 to P-TNO255) in the corresponding table indicating data portion (the numerical value affixed with "h" are represented by hexadecimal notation). Each of the part table is so designed that a start address serving as a starting point for a segment, an end address serving as an end point for the segment, and mode information (track mode) for the segment (track) are recorded.

The mode information for the track in each part table are recorded information indicating characteristics such as whether the segment is set to an over-write inhibition or data copy inhibition mode, information indicating whether it is audio information, an identification information of monaural/stereo, and the like.

The segment content of each of the part tables from (01h) to (FFh) in the managing table portion is indicated by each of the table pointers (P-TNO1 to P-TNO255) of the corresponding table indicating data portion. That is, for the first program (such as the first musical piece), a part table (for example (01h) is indicated by a table pointer. In this case, the start address of the part table (01h) becomes a start address for the recording position of the data of the first program, and similarly the end address becomes an end address for the recording position of the data of the first program. Further, the track mode information becomes information for the first program.

The above described addresses are stored using a numerical value with which a part table is indicated at a byte position in the P-TOC sector 0 is recorded in a table pointer (P-TNO1) through a prescribed calculation processing. In this format, the address of apart table specified by the calculation of $(76\times4)+((Px)\times8)$ is indicated in each table pointer (P-TNO1 to P-TNO255).

Accordingly, when a part table (01h), recorded from the 312nd byte, is indicated in the P-TOC sector 0 (which comprises 2352 bytes from the 0-th byte to the 2351st byte) a numerical value "01h" is recorded in the table pointer, and thus the position of the part table (01h) can be obtained using the table pointer through the calculation of $(76\times4)+(1\times8)=312$.

Figure 8B:
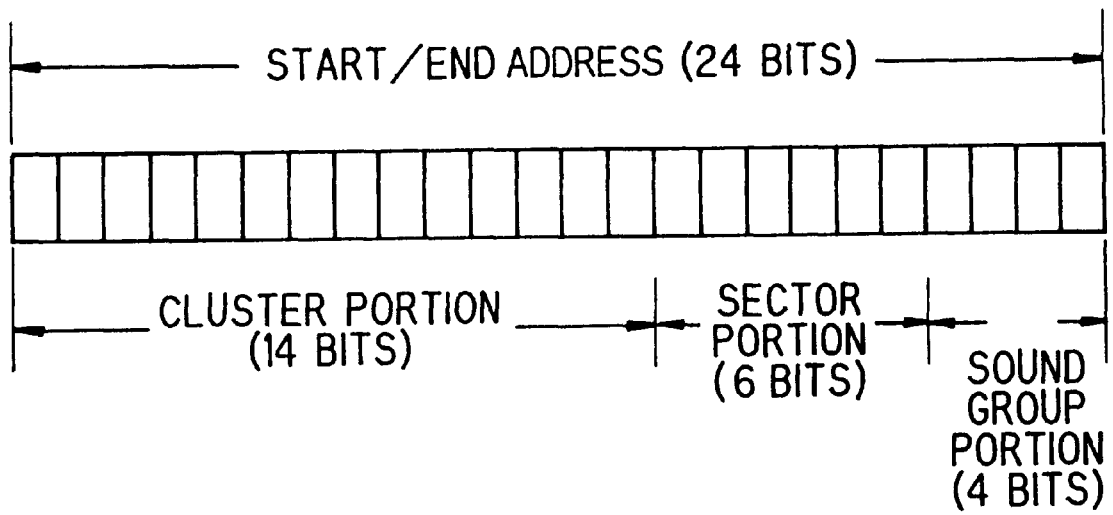

The start address/end address of 24 bits (3 bytes) in these part tables are divided into upper digits of 14 bits which serve as a cluster address, subsequent 6 bits which serve as a sector address, and subsequent lower digits of 4 bits which serve as a sound group address as shown in FIG. 8B.

Likewise, for a second program, a start address, an end address and a track mode information for the recording position of the second program are recorded in the part table (for example (02h) as indicated by the table pointer P-TNO2. Likewise, table pointers through P-TNO255 are provided, and the programs up to a 255th program can be managed on the basis of the P-TOC. By forming the P-TOC sector 0 as described above, a predetermined program can be accessed and reproduced, for example.

For a recordable/reproducible magneto-optical disc which has no pre-mastered audio data area, the corresponding table indicating data portion and the managing table portion as described above are not used in the P-TOC (these are managed by U-TOC as described later), and thus all the bytes are set to "00h".

However, for a hybrid type of disc having both of ROM area and magneto-optical area on which audio data, etc. are recorded, the audio data in the ROM area is managed using the corresponding table indicating data portion and the managing table portion.

Next, the U-TOC will be described. FIG. 7 shows the format of one sector of the U-TOC. The U-TOC is used for managing recorded programs (for instance, programs recorded through a user's recording of sounds or music) and managing information on the location of recordable areas (free areas) on which new programs can be recorded.

For example, referring to FIG. 5, when a program is to be recorded on the disc 1, the system controller 11 searches a free area on the disc on the basis of the U-TOC. The audio data corresponding to the program is then recorded on a free area found by the search. Further, in the reproducing operation, the system controller 11 identifies an area where a program (such as a musical piece) to be reproduced is recorded, and accesses the area to perform the reproducing operation.

Five sectors from a sector 0 to a sector 4 are also provided for the U-TOC, although sectors 1 through 4 are optional. Like the P-TOC, the sector (sector 0) of the U-TOC as shown in FIG. 7 is first provided with a header. The U-TOC is subsequently provided with data of a maker code, a model code, the number of a first program (First TNO), the number of a last program (Last TNO), a sector use status, a disc serial number, a disc ID, etc. at predetermined address positions, respectively. Further, it is provided with an area on which various kinds of table pointers (P-DFA, P-EMPTY, P-FRA, P-TNO1 to P-TNO255) are recorded as the corresponding table indicating data portion. The table pointers identify areas for programs which have been recorded through the user's sound recording, as well as recordable areas by pointing to areas in the managing table portion as described later.

Further, as shown in FIG. 7, 255 part tables from (01h) to (FFh) are provided as the managing table portion corresponding to the table pointers (P-DFA to P-TNO255) of the corresponding table indicating data portion. In each part table there is recorded a start address serving as a starting point for a segment, an end address serving as an end point for the segment and mode information (track mode) for the segment (this is similar to the P-TOC sector 0 as shown in FIG. 6). Further, for the U-TOC sector 0, there may occur a case where a segment indicated in each part table is linked to another segment. In order to accomplish this linkage, the U-TOC sector 0 is designed so that each part table can contain link information for indicating a part table in which the start and end addresses for a linked segment.

The start address/end address of 24 bits (3 bytes) in these part tables comprises a cluster address at the upper 14 bits, a sector address at the subsequent 6 bits and a sound group address at the lower 4 bits, as shown in Table 8B.

As described above, in this type of recording and reproducing apparatus, even when a program is recorded in a physically discontinuous manner, that is, it is recorded over plural segments, the reproducing operation is carried out while access between separate segments is carried out. In this way the reproducing operation can be carried out without hindrance. With respect to a program (such as a musical piece) which is recorded through a user's sound recording, for the purpose of effective use of recordable areas, the program may be divided into separate segments. Therefore, the link information is provided to help locate and allow access to all the separate segments of a program. For example, by indicating a part table to be linked on the basis of one of the numbers (01h) to (FFh) allocated to the respective part tables, the linkage of the part tables can be performed. (Ordinarily, programs which are permanently prerecorded are not subjected to segment division, and the link information for theses programs is set to "(00h)" in the P-TOC sector 0 as shown in FIG. 6).

That is, in the managing table portion of the U-TOC sector 0, one part table represents one segment. For a program comprising three linked segments, the positions of these segments are managed by the three part tables which are linked to each other with the link information.

For the U-TOC, like the table pointers of the P-TOC, the table pointers (P-DFA, P-EMPTY, P-FRA, P-TNO1 to P-TNO255) may be used in a predetermined calculation to obtain actual byte positions of the part tables indicated. For example, if a table pointer has the value (Px), the byte position of the corresponding part table is determined through the calculation of (76×4)+((Px)×8), and the location of the part table is indicated with this byte position. In the U-TOC, the link information in each part table may function in a similar manner. For example, representing the stored value of the link information by (Lx), the byte position of a part table can be determined through the calculation of (76×4)+((Lx)×8) to thereby indicate the part table location.

The segment contents of the respective part tables from (01h) to (FFh) in the managing table portion of the U-TOC sector 0 are represented as follows by the table pointers (P-DFA, P-EMPTY, P-FRA, P-TNO1 to P-TNO255) in the corresponding table indicating data portion.

The table pointer P-DFA is provided for indication of a defective area on the magneto-optical disc 1, and indicates a part table or a head part table of plural part tables indicating a track portion (i.e., a segment) which is defective (due to, for instance, a scratch). That is, when any defective segment exists, any one of (01h) to (FFh) is recorded in the table pointer P-DFA, and the defective segment is indicated with start and end addresses in the corresponding part table. Further, when a second defective segment exists, this second defective segment will be allotted a part table which is indicated by the link information for the part table corresponding to table pointer P-DFA. Still further, when no other defective segments exist, the link information of the part table for the last defective area is set to "(00h)" to indicate that there is no subsequent linkage.

The table pointer P-EMPTY indicates an unused part table or a head part table of plural unused part tables. When any unused part table exists, the location of this part table, between (01h) to (FFh) inclusive, is recorded as the table pointer P-EMPTY. When plural unused part tables exist, the part tables are successively indicated from the part table indicated by the table pointer P-EMPTY on the basis of the link information. All of the unused part tables are linked with one another through link information in the managing table portion.

For example, when a magneto-optical disc has no recorded programs (such as music pieces) and no defective areas, all of the part tables are unused. Note that this example ignores the possible existence of apart table used for free area which will be discussed below. Accordingly, unused part table (01h) is indicated by the table pointer P-EMPTY. Unused part table (02h) is subsequently indicated with the link information of the part table (01h). Unused part table (03h) is subsequently indicated with the link information of the part table (02h). This linking operation is repeated until the linkage to the unused part table (FFh) is carried out. In this case, the link information of the part table (FFh) is set to "(00h)" to indicate that there is no subsequent linkage.

The table pointer P-FRA represents a free area (containing an unrecorded or erased area) in which data can be written on the magneto-optical disc 1. P-FRA indicates the location of a part table or a head part table of plural part tables of a track portion (i.e. a segment) which is a free area. That is, when any free area exists, one of the part tables, between (01h) and (FFh) inclusive, is recorded in the table pointer P-FRA. A segment serving as a free area is indicated with its start and end addresses in the corresponding part table. Further, when a plurality of segments as described above exist, that is, plural part tables exist, the part tables are successively indicated on the basis of the link information until the part table with link information "(00h)" is reached.

Figure 9:
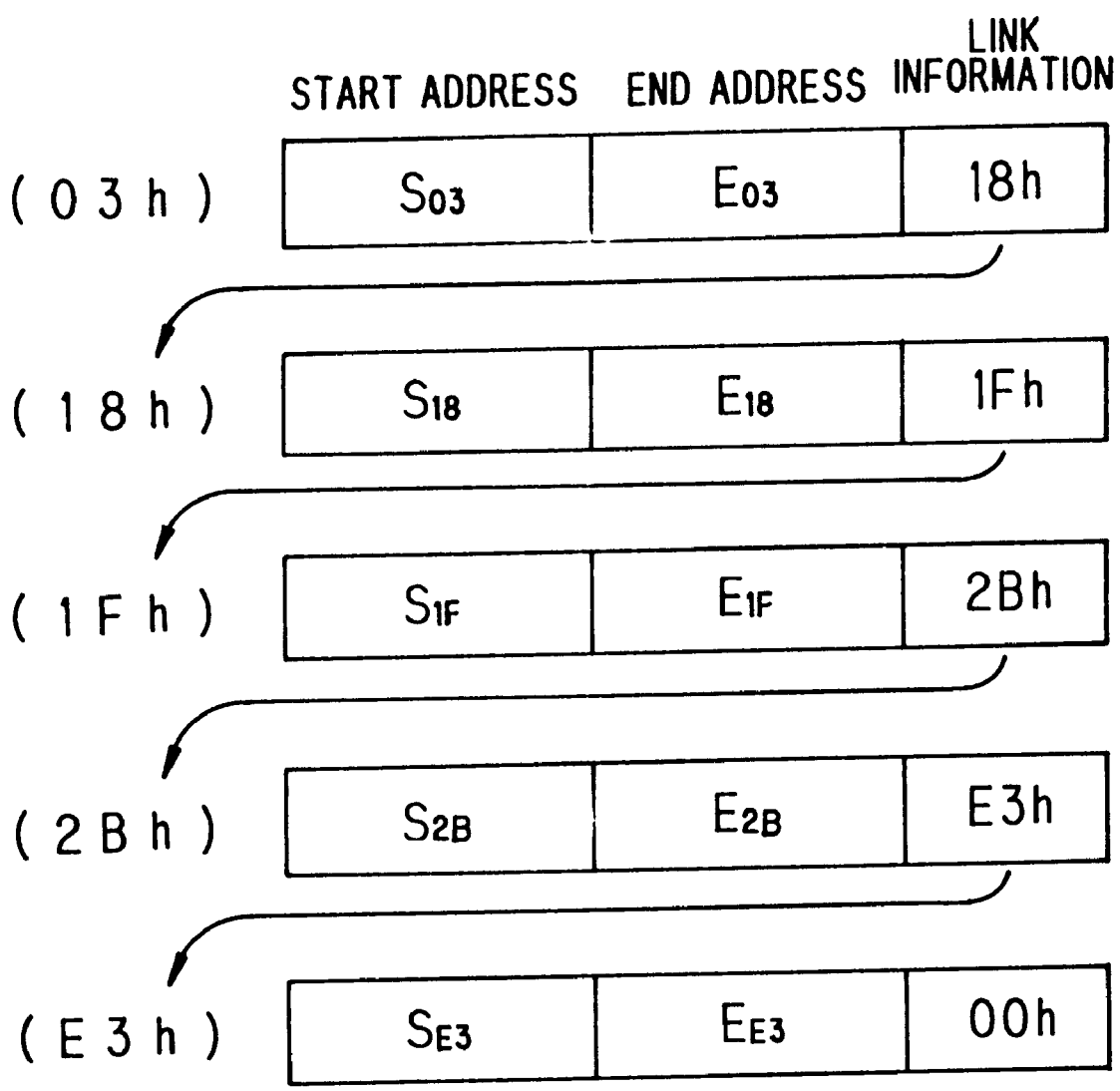
FIG. 9 is a schematic view of a managing mode of U-TOC information on a disc.

FIG. 9 schematically shows the management state of segments serving as free areas by the part tables. When each of segments (03h)(18h)(1Fh)(2Bh)E3h) serve as a free area as shown in FIG. 9, this management state is represented by linkage of the part tables (03h)(18h)(1Fh) (2Bh)(E3h) in the corresponding table indicating data portion. Note that defective areas and the unused part tables can be managed in a similar manner as respectively described above.

The table pointers P-TNO1 to P-TNO255 represent the programs which are recorded on the magneto-optical disc 1 by the user. For example, the table pointer P-TNO1 indicates a part table indicating a segment (or the first segment of plural segments) in which data of a first program is recorded. For example when a first program is recorded on the disc without dividing a track into sections (that is, with one segment), the recording area of the first program is recorded with the start and end addresses of a part table which is indicated by the table pointer P-TNO1.

Further, when a second program is recorded such that it is divided into plural, discrete segments on the disc, the respective segments indicating the recording position of the program are successively indicated the order in which reproduction is to take place (hereinafter sometimes called time order). That is, on the basis of the part table indicated by the table pointer P-TNO2, the other part tables are successively indicated by the link information in the time order. This linkage continues until a last part table for the program whose link information is set to "(00h)" is reached. Note that this is similar to the free area linkage method shown in FIG. 9. As described above, the second program is recorded to successively indicate all the segments in which the data of the second program is recorded. In this way the audio data (such as a musical piece) can be continuously reproduced from the discrete segments. Also, the recording area can be effectively used through the access of a series of segments by the optical head 3 and the magnetic head 6 when the second program is reproduced. Also, the area of the second program can be over-written utilizing the segment locations and linkages recorded in U-TOC sector 0.

As described above, the area management and the management of the permanently prerecorded programs on the disc are carried out by the P-TOC, and the programs (such as musical pieces) which are recorded in the recordable user area, the free areas, etc. are managed by the U-TOC.

These TOC information are read into the buffer RAM 13, and can be referred to by the system controller 11. The memory control device and the address generating circuit of this embodiment are constructed as being suitable for the processing of reading out the part tables from the P-TOC or the U-TOC in the recording, reproducing and other operations, the trash area processing, the U-TOC edit processing, etc.

The memory control device of this embodiment is comprised of the memory controller 12 and system controller 11 (which controls the functioning of the memory controller 12 in the recording and reproducing apparatus as shown in FIG. 5). The address generating circuit of this embodiment is equipped in the memory controller 12.

The construction and operation of the memory control device and the address generating circuit as described above will be described with reference to FIGS. 10 to 12.

Figure 10:
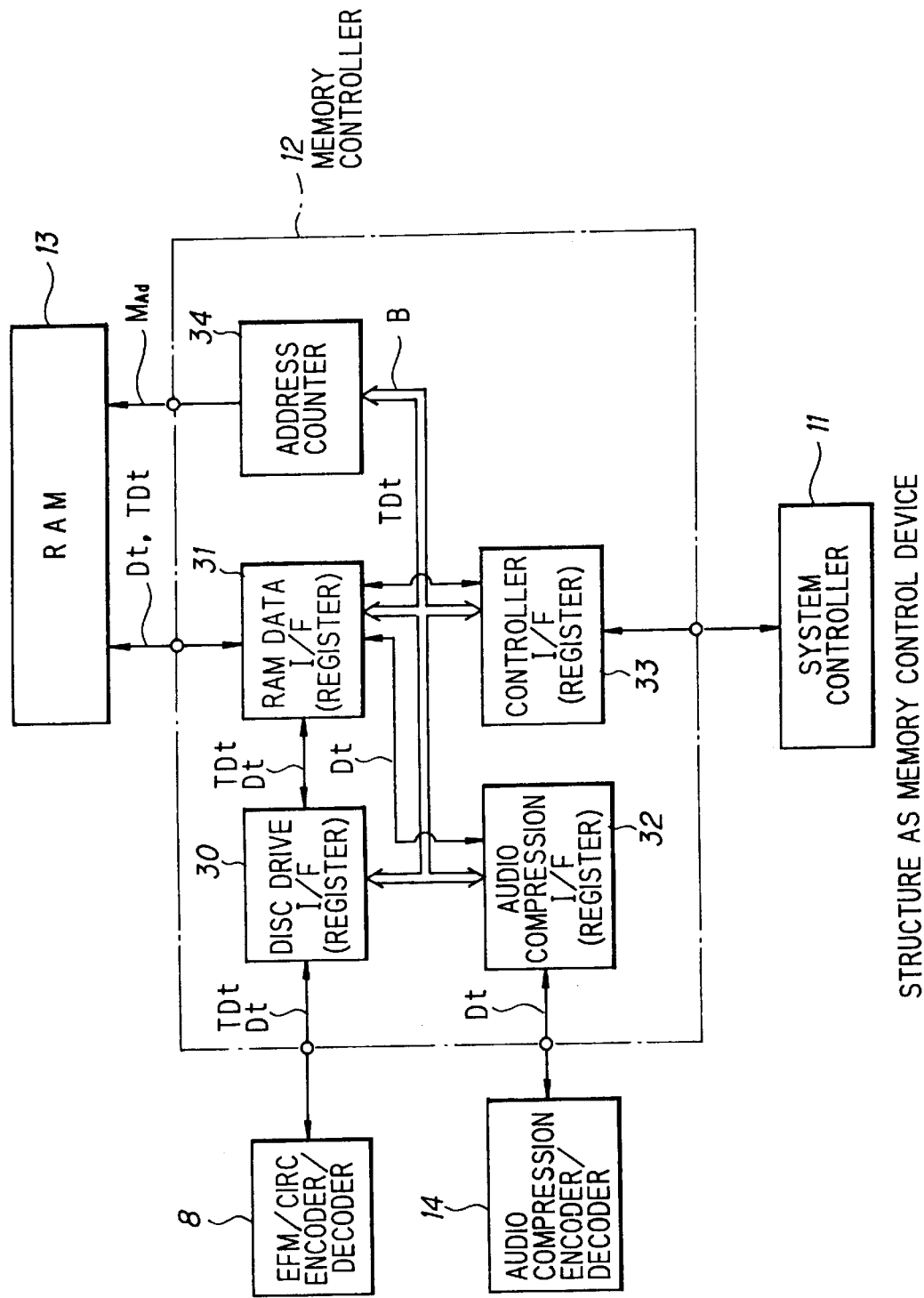
FIG. 10 is a block diagram showing a memory control device and a peripheral circuit portion of the embodiment of FIG. 5.

FIG. 10 is a block diagram showing the inner construction of the memory controller 12. A reference numeral 30 represents a disc drive interface unit, and serves to receive and hold record/reproduction data Dt and TOC information TDt for the disc drive side, that is, the encoder/decoder unit 8.

A reference numeral 31 represents a RAM data interface unit, and serves to perform data write-in/read-out operations and hold the data for the buffer RAM 13. The data to be subjected to the write-in/read-out operations are the record/reproduction data Dt and the TOC information TDt.

A reference numeral 32 represents an audio compression interface unit, and serves to receive and hold the record/reproduction data Dt for the audio compression unit, that is, the encoder/decoder unit 14.

A reference numeral 33 represents a controller interface unit, and serves as an interface for the system controller 11. The controller interface unit 33 carries out reception and transmission of the TOC information TDt from and to the system controller 11, receives a control signal from the system controller 11, and holds these data.

A reference numeral 34 represents an address counter, and it serves to generate a write-in address/read-out address (MAd) through an operation as described later on the basis of the link data (table pointer or link information) which is supplied through the controller interface unit 33 and output it to the buffer RAM 13.

B represents a control bus connected to each of the above described units.

Figure 11:
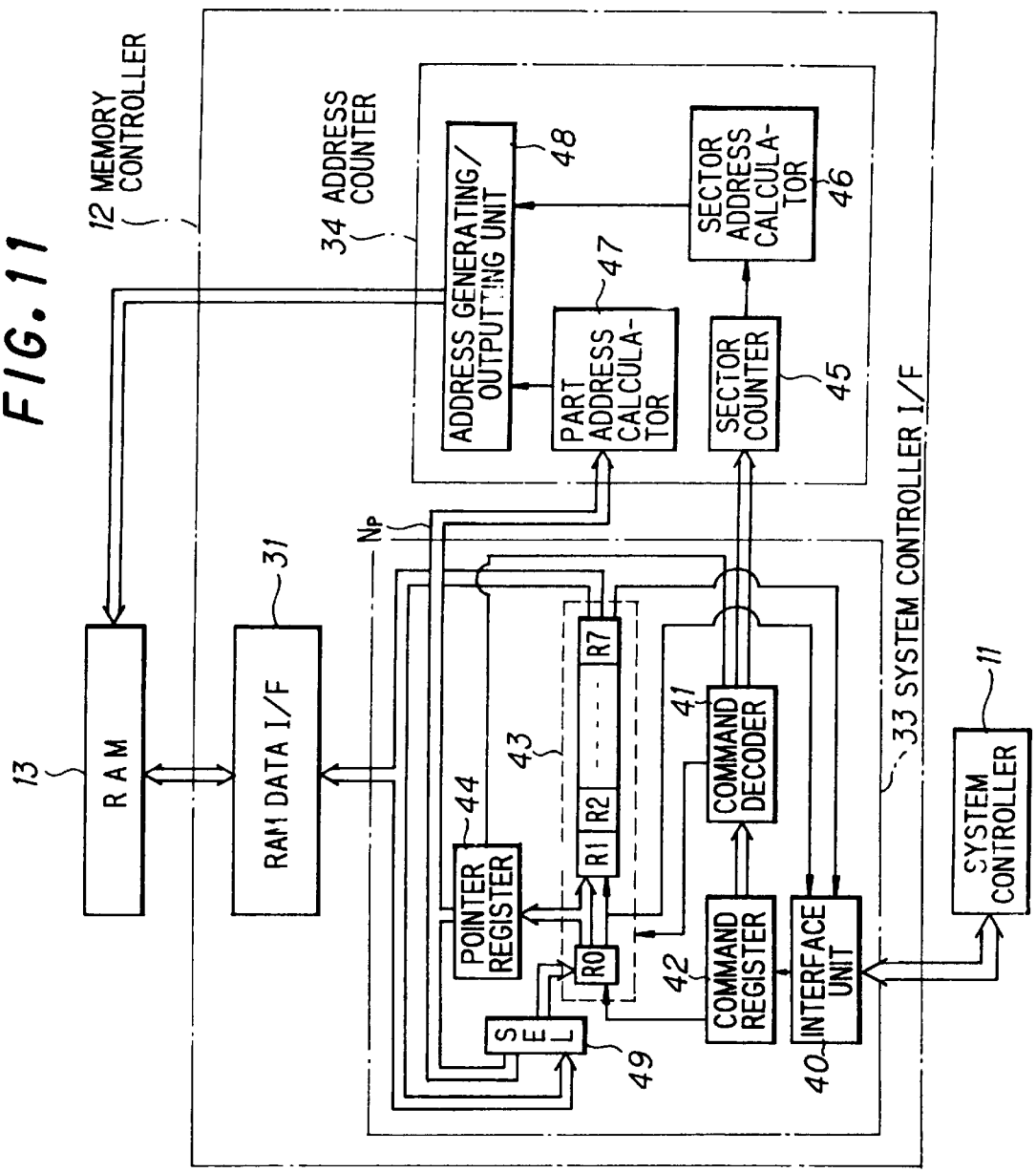
FIG. 11 is a block diagram showing an address generating circuit and a peripheral circuit portion of the embodiment of FIG. 5.

The construction of the address generating circuit is shown in FIG. 11. The address generating circuit of this embodiment is constructed by the address counter 34, the RAM data interface unit 31 and the prescribed function portions of the controller interface unit 33.

A reference numeral 40 represents an interface unit in the controller interface unit 33. The interface unit 40 receives several signals (SWDT: write data signal, SRDT: read data signal, SCK: shift clock, XLAT: latch signal, etc.).

A reference numeral 42 represents a command register for holding the control signal from the system controller 11 through the interface unit 40. The command register 42 is able to hold 8 bits of data.

Reference numeral 41 represents a command decoder for decoding the control signal from the system controller 11 through the command register 42.

A reference 43 represents a shift register, and when a part table is read in from the P-TOC or the U-TOC held in the buffer RAM 13, the part table is held in the shift register. The part table contains a start address of 3 bytes, an end address of 3 bytes, track mode information of one byte and link information of one byte as described above. Accordingly, 8-byte data are supplied through the read-out of one part table, and the data of each byte is held as data of R7 to R0 in the data register 43. For example, the data R7 to R5, the data of R4, the data R3 to R1 and the data of R0 are allocated to the start address, the track mode information, the end address and the link information, respectively.

A reference numeral 44 represents a pointer register which is constructed as a temporary register. When data is read from the buffer RAM 13, this read data is set in the shift register 43. Upon completion of reading the data into the shift register 43, the data in R0 represents the link information and this data is copied to the pointer register 44 in accordance with a load strobe signal from the command decoder 41.

A reference numeral 49 represents a selector which selects data to output from the shift register 43.

A reference numeral 45 represents a sector counter provided inside of the address counter 34, and it counts sectors of data to be read in accordance with the control signal from the system controller 11. As described above, five sectors are provided for each of the P-TOC and the U-TOC, and the programs are constructed on a sector basis as well. In the buffer RAM 13, an area which serves as a buffer to store data for continuous functioning, and an area for holding the P-TOC and the U-TOC are separately set. The sector counter 45 counts sectors to be accessed in the buffer RAM 13 as described above.

A reference numeral 46 represents a sector address calculation unit. Since one sector comprises 2352 bytes, a sector number SC obtained by the sector counter 45 is multiplied by 2352 (i.e., SC×2352) to thereby obtain a byte position as a sector address. That is, the address which is calculated by the sector address calculation unit 46 becomes the head address of a sector containing a byte to be accessed in the buffer RAM 13.

A reference numeral 47 represents a part address calculation unit, and it conducts a prescribed calculation on a numeric value $N_p$ supplied from the pointer register 44 to calculate addresses with which part tables of the U-TOC and the P-TOC are accessed. The address of each byte must be calculated to access a part table constructed by 8 bytes, and the calculation which is executed in the part address calculation unit 47 is as follows.

$4×76+N_p×8$ . . . address of first byte in a part table
$4×76+1+N_p×8$ . . . address of second byte in a part table
$4×76+2+N_p×8$ . . . address of third byte in a part table
$4×76+3+N_p×8$ . . . address of fourth byte in a part table
$4×76+4+N_p×8$ . . . address of fifth byte in a part table
$4×76+5+N_p×8$ . . . address of sixth byte in a part table
$4×76+6+N_p×8$ . . . address of seventh byte in a part table
$4×76+7+N_p×8$ . . . address of eight byte in a part table The address obtained from the part address calculation unit 47 becomes a byte address in a sector, which constitutes the access address of the buffer RAM 13.

The byte address obtained from the part address calculation unit 47 and the sector address (SC×2352) obtained from the sector address calculation unit 46 are added to each other and set as an access address in an address generating/outputting unit 48, and the access address is output to the buffer RAM 13.

The address generating circuit is constructed as described above, and thus in the access operation of the tables in the U-TOC or P-TOC, the system controller 11 is not required to execute the calculation processing for the address calculation and the transmission of the calculated address to the address counter 34. Further, when the access of the part tables is required, the system controller 11 first outputs the table pointer and the set command of the table pointer, and subsequently only an access execution command may be output to the memory controller 12.

Figure 12:
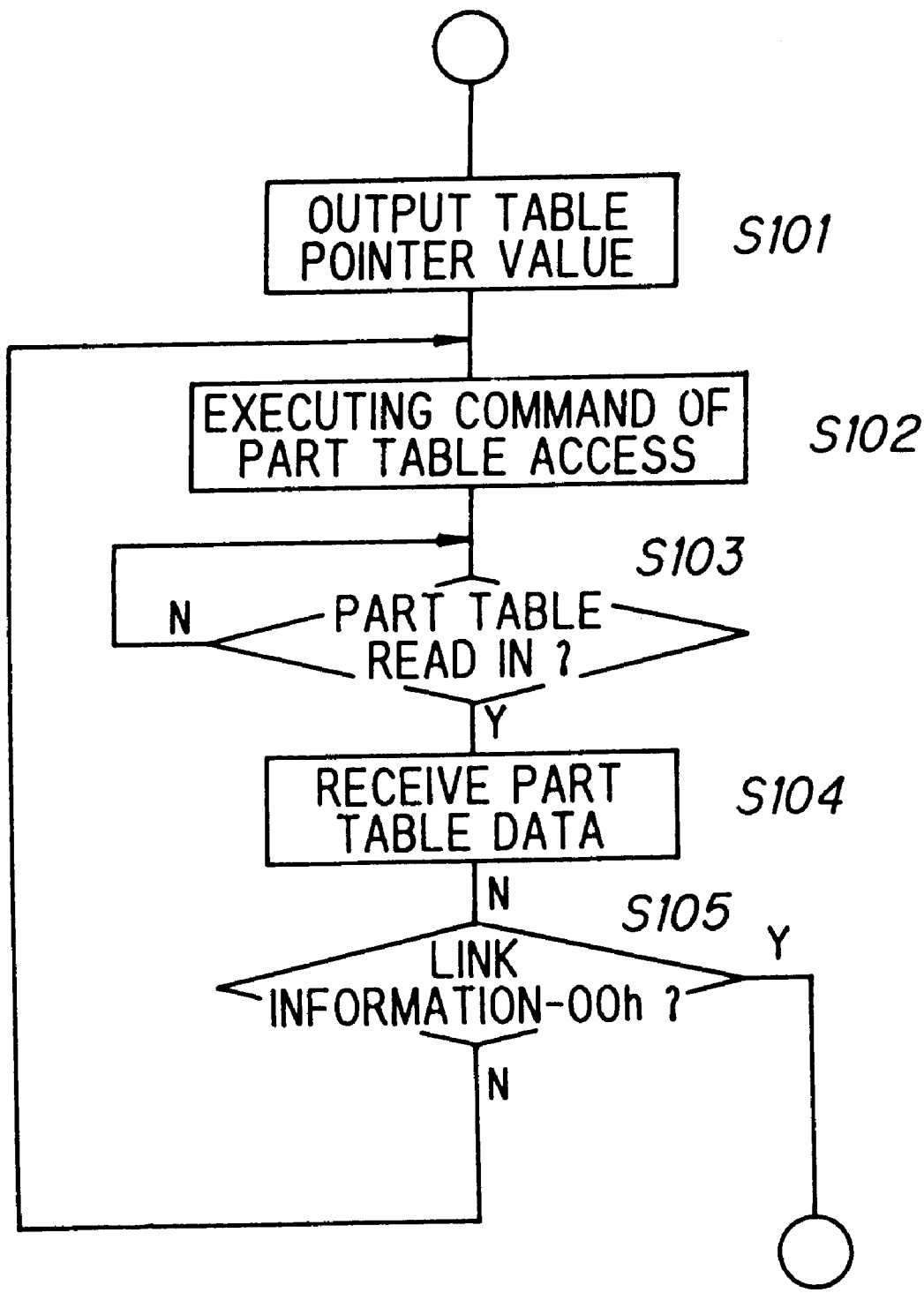
FIG. 12 is a flowchart for a part table read-in processing by the memory control device of the embodiment of FIG. 5.

The processing which occurs when the part tables of the U-TOC or P-TOC are accessed by the memory control device of this embodiment (the processing of the system controller 11) will be described with reference to FIG. 12.

The access operation of the part tables is executed for various cases such as the search of free areas in the recording operation, the search of segment positions during reproduction of a program, edit processing to update the U-TOC, the search of part tables corresponding to segments in association with the trash area processing of the U-TOC, etc. At this time, a table pointer serving as a starting point for the part tables to be accessed is output to the memory controller 12 (at step S101). For example when free areas are searched, the value of the table pointer P-FRA is supplied.

When a table pointer is supplied through the interface unit 40 into the command decoder 41 of the controller interface unit 33 in the memory controller 12, the table pointer is held in the command register 42 of the controller interface unit 33.

Subsequently, the system controller 11 outputs the access executing command (8-byte continuous read-out command) of the part tables in the U-TOC (at step S102), and in response to the output of the access executing command, the value of the table pointer held in the command register 42 is supplied through the data R0 of the data register 43 to the pointer register 44, and set in the pointer register 44. Now, it is assumed that the table pointer P-FRA is set in the pointer register 44. The sector counter 45 is also set in accordance with the part table to be read in.

The value of the table pointer P-ERA which is set in the pointer register 44 is supplied as the numeric value NP the part address calculation unit 47. The part address calculation unit 47 successively calculates byte addresses for 8 bytes, as described above, using the numeric value $N_p$. That is, the part address calculation unit 47 continuously outputs the addresses for the respective bytes of the part table to be accessed.

In the address generating/outputting unit 48, the addresses which are successively output from the part address calculation unit 47 are added as the byte address for the sector address from the sector address calculation unit 46, and output as the access address to the buffer RAM 13. That is, the access addresses are successively output to the buffer RAM 13 for the respective bytes of the part table indicated by the table pointer P-FRA.

In accordance with the above output, a part table is read out from the buffer RAM 13. In the case as shown in FIG. 9 for example, the part table (03h) as indicated by the table pointer P-FRA is read out. That is, the start address, the track mode information, the end address and the link information of the part table (03h) are successively taken into the data register 43 through the RAM data interface unit 31.

Upon completion of reading the part table, the system controller shifts its processing from the step S103 to a step S104 (see FIG. 12) to receive the part table data of 8 bytes which are held in the data register 43.

Then it is determined whether the link information in the received data of the part table, that is, the data received as data D0 is "00h" (at step S105). If the data received as link information is "00h", the part table is not linked to another part table, then the part table access processing on the basis of the table pointer is terminated (S105→YES).

If the link information is present, the system controller 11 outputs the access executing command (S105→S102). By this access executing command, the value which has been still held as data R0 in the data register 43 is set in the pointer register 44, and the numerical value $N_p$ set in the pointer register 44 is supplied to the part address calculation unit 47.

Subsequently, the part address calculation unit 47 conducts the same calculation processing as the previous operation on the numerical value $N_p$ to determine the address of each byte of a part table.

For example, for the case as shown in FIG. 9, by the access executing command after the part table (03h) is read in, the address for apart table (18h) is generated, and this part table at (18h) is read out In this way the 8-byte data of the read-out part table (18h) is held as the data R0 to R7 in the data register 43.

Likewise, at subsequent stages, the system controller 11 confirms the presence or absence of linkage, and only when any link exists will the system controller 11 carry out the output operation of the access executing command. In the part address calculation unit 47, an address is determined on the basis of the link information which is then held as data R0 in the data register 43, and its read-out is executed. In the case of FIG. 9, subsequently to the part table (18h), the part table (1Fh), the part table (2Bh) and the part table (E3h) are read out. The system controller 11 terminates the access processing of the part tables when the link information is set to "00h" at the time when the data of the part table (E3h) is received.

Similar operations are carried out for the access of part tables which are recorded in P-TOC or U-TOC for segments on which a program is recorded. First, the system controller supplies any one of the table pointers P-TNO1 to P-TNO255 to the memory controller 12, and subsequently it can take all the data of the part tables for a prescribed program by only the output processing of the access executing command as shown in FIG. 12.

By constructing a memory controller 12 equipped with the address generating circuit as described above, the system controller 11 serving as a part of the memory control device is not required to carry out the address calculation processing and the processing of communicating the calculated address to the memory controller 12, so that the processing load can be greatly reduced. In addition, the communication data amount can be also greatly reduced, so that the processing time can be shortened. Particularly when a large number of part tables must be searched for the U-TOC edit processing, the trash area extinguishing processing, etc., the reduction in communication data amount and in processing load can enable the processing time to be remarkably shortened.

The above embodiment relates to the case where the memory control device and the address generating circuit are applied to the recording and reproducing apparatus for the magneto-optic disc 1, however, they may be applied to other equipment such as a device exclusively used for recording, etc.

Further, the construction of the memory control device and the address generating circuit are not limited to that as shown in FIGS. 10 and 11.

As described above, according to this invention, a next access address is calculated on the basis of the link data (table pointer or link information) in the address generating circuit of the memory controller when the managing information (P-TOC, U-TOC) is searched. Therefore, there is a reduction in the processing load of the system controller relative to that of conventional systems, and the communication of the access address between the system controller and the memory controller is not required, so that the data processing time can be remarkably shortened.

As described above, since the address generating circuit comprises the controller interface means, the memory interface means, the link data register means, the address calculation means and the address output means, in accordance with the table pointer or read-in link information, the proper address generating operation can be realized by a single executing command from the system controller.

Although the present invention has been shown and described with respect to preferred embodiments, various changes and modifications could be effected by a person skilled in the art without departing from the spirit or scope of the invention as defined in the appended claims.

What is claimed is:

1. A reproducing apparatus for reproducing data from a recording medium which has recorded data, including management data for managing recorded data, the reproducing apparatus comprising:

a reproducing means for reproducing data from the recording medium;

a random access memory means for storing management data reproduced by the reproducing means at locations in the memory means which are specified by memory means addresses;

a memory controller for sending the memory means addresses to the memory means and for receiving the management data from the memory means corresponding to the memory means addresses; and a system controller for sending a control signal to the memory controller which causes the memory controller to receive portions of the management data from the memory means;

wherein the memory controller comprises a means for generating the memory means addresses to be sent to the memory means in accordance with the control signal from the system controller and management data received from the memory means.

2. The reproducing apparatus according to claim 1, wherein the management data comprises a corresponding table indicating data portion for respectively indicating the location of part tables, and a plurality of part tables each including a link information, a recorded start address and an end address.

3. The reproducing apparatus according to claim 2, wherein the memory means addresses are generated by the memory controller in accordance with the link information in the portions of the management data received by the memory controller.

4. The reproducing apparatus according to claim 2, wherein memory means addresses are generated by the memory controller in accordance with the control signal sent by the system controller.

5. The reproducing apparatus according to claim 4, wherein the plurality of part tables include at least one part table which indicates recordable areas on the recording medium.

6. A memory control device for controlling a random access memory means in which recording data and management data, including link information, for managing the recording data are separately stored, the memory control device comprising:

a controller interface means for receiving pointer data which indicates an address in the memory means;

a memory interface means for receiving data from and transmitting data to the memory means;

a data register means for storing link information supplied in the management data received from the memory means through the memory interface means;

a pointer data register means for storing the link information from the data register means and pointer data from the controller interface means;

an address calculation means for executing a calculation on the link information stored in the pointer data register means; and an address output means for outputting the value calculated in the address calculation means to the memory means as an address of data in the memory means to be transmitted to the memory interface means.

7. The memory control device according to claim 6, wherein the management data comprises a plurality of part tables each including a recorded start address, an end address, and link information for linking one part table to a second part table, the management data further comprising a corresponding indicating table portion for indicating the location of the part tables.

8. The memory control device according to claim 7, wherein the pointer data comes from the corresponding indicating table portion.

9. The memory control device according to claim 8, wherein the corresponding indicating table data portion includes at least one part table which indicates recordable areas on a recording medium.

10. A method of controlling a memory using a system controller and a memory controller to access from the memory a plurality of part tables, the method comprising the steps of:

outputting a table pointer, from the system controller to the memory controller, as a starting point for a first part table to be accessed from the memory;

outputting an access executing command, from the system controller to the memory controller, which causes the table pointer to be supplied to a register;

generating, in the memory controller, a first access address in accordance with the table pointer;

reading the first part table stored in the memory at the first access address, where the first part table which is read includes link information;

determining the value of the link information, where the link information indicates a starting point of a second part table;

generating, in the memory controller, a second access address in accordance with the link information; and reading the second part table from the memory at the second access address.

11. A reproducing apparatus for reproducing data from a recording medium, the reproducing apparatus comprising:

reproducing means for reproducing data from the recording medium;

a random access memory means for storing management data used to manage the data on the recording medium;

a system controller for outputting a control signal comprising pointer data to indicate a portions of the management data corresponding to the pointer data; and a memory control device for receiving pointer data, calculating a address in the memory means for the portion of the management data corresponding to the pointer data, and reading a portion of the management data from the memory means which is located at the calculated address;

wherein the portion of the management data read from the memory means contains link information and the link information is also used by the memory control device as pointer data for reading further portions of the management data from the memory means.

12. The reproducing apparatus of claim 11 wherein the memory control device comprises:

an interface unit for receiving pointer data from the system controller;

an address counter for calculating addresses based on pointer data and outputting calculated addresses to the memory means; and a shift register for storing portions of the management data received from the memory means.

13. A recording apparatus for recording data on a recording medium, the recording apparatus comprising:

recording means for recording data on the recording medium;

a memory means for storing management data used to manage the data on the recording medium;

a system controller for outputting a control signal comprising pointer data to indicate portions of the management data corresponding to the pointer data; and a memory control device for receiving pointer data, calculating an address in the memory means for the portion of the management data corresponding to the pointer data, and reading a portion of the management data from the memory means which is located at the calculated address;

wherein the portion of the management data read from the memory means contains link information and the link information is also used by the memory control device as pointer data for reading further portions of the management data from the memory means.

14. The recording apparatus of claim 13 wherein the memory control device comprises:

an interface unit for receiving pointer data from the system controller;

an address counter for calculating addresses based on pointer data and outputting calculated addresses to the memory means; and a shift register for storing portions of the management data received from the memory means.

15. A reproducing apparatus for reproducing data from a recording medium which has recorded data, management data for managing said recorded data, said management data including link information, at least a address information for pointing out physical address, the reproducing apparatus comprising:

a reproducing means for reproducing the recorded data and the management data from the recorded medium;

a random access memory means for storing said recorded data and management data from said reproducing means through a memory controller means;

the memory controller means for generating a memory means address in accordance with said link information of management data and sending the memory means address to the memory means;

a system controller means for sending a control signal to the memory controller means which demand for requiring the management data from the memory;

wherein the memory controller means demands for accessing the management data to the memory in accordance with said control signal and said generated address.

16. A memory control device for controlling a random access memory means in which recording data and management data are stored respectively, said recording data and management data are supplied from a decoder, said management data for managing said recording data and including at least a address information, link information, the memory control device comprising:

a memory interface means for receiving data from the decoder and memory means and for transmitting data to the memory means and a data register means;

a extracting means for extracting the link information from the management data are transmitted from the decoder;

said data register means for storing the link information from the extracting means;

an address calculation means for calculating an address in accordance with the link information from the data register means;

an address output means for outputting the address calculated in the address calculation means to the memory means as an address of data in the memory means to be transmitted to the memory interface means.

* * * * *